(12) United States Patent
Muceus

(10) Patent No.: US 11,555,664 B2
(45) Date of Patent: Jan. 17, 2023

(54) HEAT PROTECTIVE DEVICE

(71) Applicant: Battle Born Supply Co., Paradise Valley, NV (US)

(72) Inventor: Ian Muceus, Paradise Valley, NV (US)

(73) Assignee: Battle Born Supply Co., Paradise Valley, NV (US)

( * ) Notice: Subject to any disclaimer, the term of this patent is extended or adjusted under 35 U.S.C. 154(b) by 0 days.

(21) Appl. No.: 17/450,751

(22) Filed: Oct. 13, 2021

(65) Prior Publication Data

US 2022/0120528 A1    Apr. 21, 2022

Related U.S. Application Data

(60) Provisional application No. 63/198,394, filed on Oct. 15, 2020.

(51) Int. Cl.
*B28B 1/00* (2006.01)
*B28B 11/24* (2006.01)
(Continued)

(52) U.S. Cl.
CPC .............. *F41A 21/44* (2013.01); *B28B 1/001* (2013.01); *B28B 11/243* (2013.01); *B33Y 40/20* (2020.01); *F27D 5/00* (2013.01); *F27D 5/0018* (2013.01)

(58) Field of Classification Search
CPC ... B29C 64/106; B29C 64/112; B29C 64/118; B29C 64/124; B29C 64/153; B29C 64/141; B29C 64/165; B29C 64/188; B22F 10/14; B22F 10/16; B22F 10/18; B22F 10/64; B22F 10/22; B22F 10/25; B22F 10/28; F16L 59/021; F16L 59/026; F16L 59/028; F16L 59/029; F16L 59/10; F41A 21/44; B28B 1/001; B28B 11/243; B33Y 10/00; B33Y 40/20
See application file for complete search history.

(56) References Cited

U.S. PATENT DOCUMENTS 4,638,713 A    1/1987 Milne et al.
D860,369 S    9/2019 Sakash et al.
(Continued)

FOREIGN PATENT DOCUMENTS

WO    2014087401 A1    6/2014

OTHER PUBLICATIONS

Beecroft M. 3D printing of weft knitted textile based structures by selective laser sintering of nylon powder. IOP Conference Series: Materials Science and Engineering, Jul. 1, 2016, vol. 137, pp. 1-7 introduction; and figures 10-12.
(Continued)

*Primary Examiner* — Michael P Wieczorek
(74) *Attorney, Agent, or Firm* — MLO, a professional corp.

(57) ABSTRACT

A heat protective device includes a sheet having a first edge opposite a second edge. The sheet is comprised of a plurality of intertwined links that are movable with respect to each other. A strip is positioned between the first edge of the sheet and the second edge of the sheet. A fastener couples the first edge of the sheet and the second edge of the sheet to the strip to form a tubular shape. The fastener is configured to adjust a diameter of the tubular shape to releasably fix the heat protective device about an object. A method for manufacturing a heat protective device is also disclosed.

9 Claims, 14 Drawing Sheets

(51) Int. Cl.
    *B33Y 40/20*         (2020.01)
    *F41A 21/44*        (2006.01)
    *F27D 5/00*         (2006.01)

(56) References Cited

U.S. PATENT DOCUMENTS

| | | |
|---|---|---|
| 10,596,660 B2 * | 3/2020 | McCarthy ............. B22F 3/1103 |
| 2012/0167435 A1 | 7/2012 | Poling |
| 2013/0015652 A1 | 1/2013 | Thomas et al. |
| 2013/0299035 A1 | 11/2013 | Laurent et al. |
| 2015/0241159 A1 | 8/2015 | Michal et al. |
| 2016/0076845 A1 | 3/2016 | Almazan et al. |
| 2017/0008039 A1 | 1/2017 | Weinberger et al. |
| 2018/0148364 A1 | 5/2018 | Klein et al. |
| 2018/0271572 A1 * | 9/2018 | Whyne ................. A61F 2/2875 |

OTHER PUBLICATIONS

International Search Report and Written Opinion dated Jan. 13, 2022 for PCT Patent Application No. PCT/IB2021/059422.
Suppressor Cover, Armageddon Gear, Accessed Online On Jan. 7, 2021, 4 pages, https//www.armageddongear.com/Suppressor-Cover.

* cited by examiner

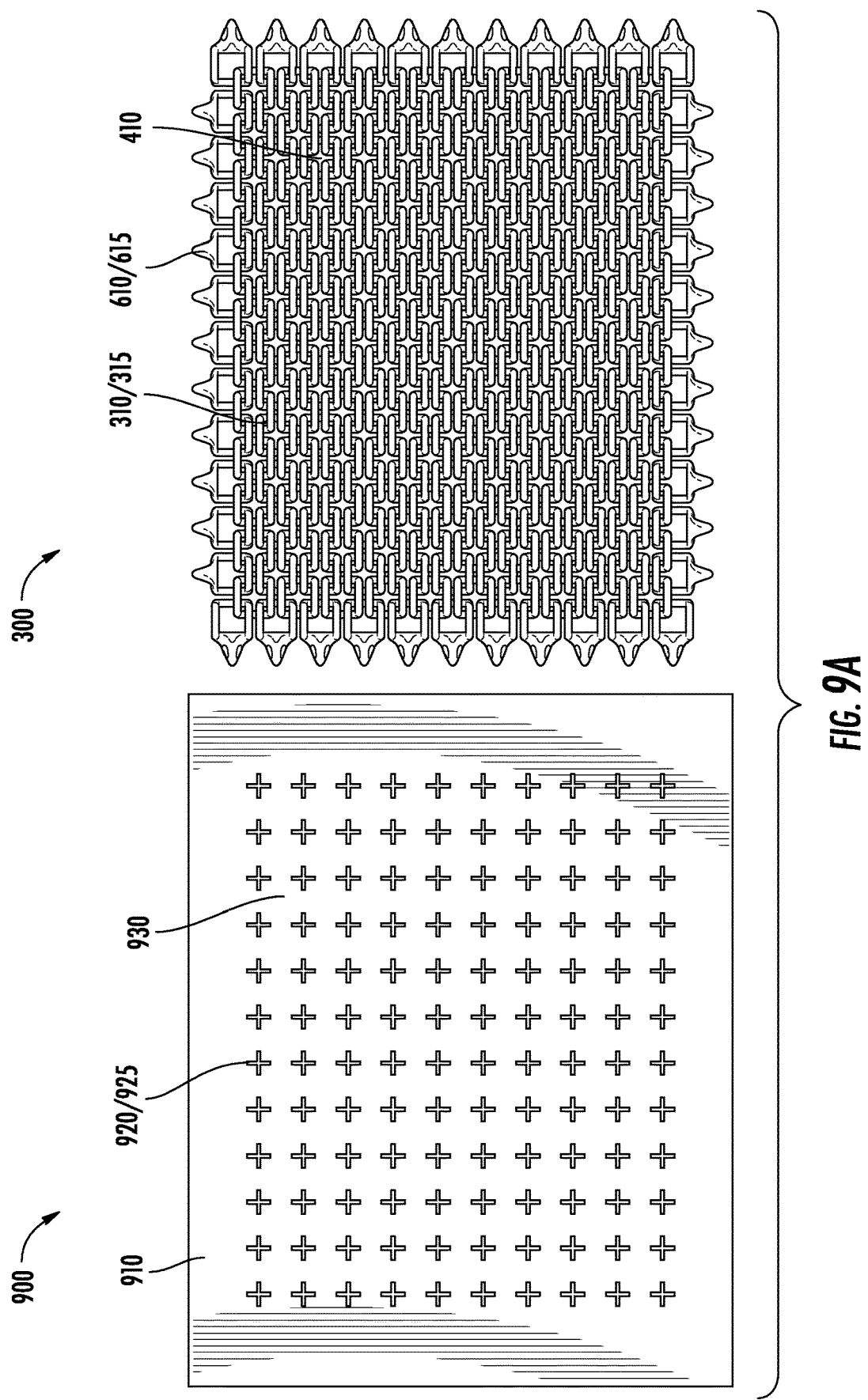

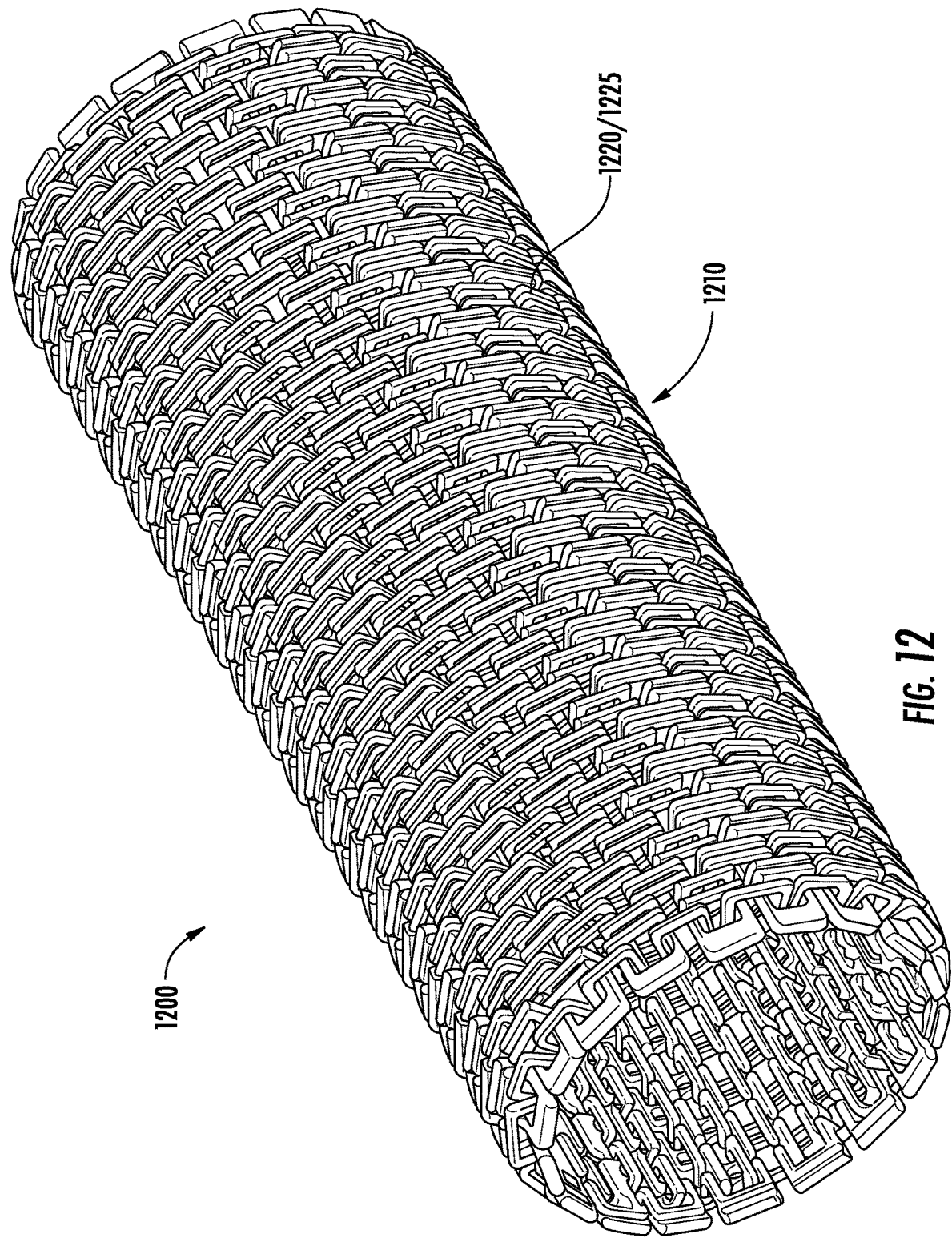

HEAT PROTECTIVE DEVICE

RELATED APPLICATIONS

This application claims priority to U.S. Provisional Patent Application No. 63/198,394 filed on Oct. 15, 2020, and entitled "Heat Protective Sleeve," which is hereby incorporated by reference in full.

BACKGROUND

Firearms generate a high amount of heat when projectiles are discharged. Firearms include a barrel, which is a tube through which the projectile travels, and may also include a sound suppressor attached to the firing end of the barrel (i.e., the muzzle). Sound suppressors, which are also known as silencers, increase the volume available for propellant gases to disperse, above the volume that is provided by the cartridge and barrel of the firearm. Both the barrel and sound suppressor can become dangerous for a human to touch after use, reaching temperatures on the order of several hundred degrees. Consequently, an operator must often wait several minutes before removing a suppressor. It is also common for users to have burns on their legs due to contact with a hot barrel and/or suppressor, while a firearm is slung around their body on a gun sling.

A miraging phenomenon or optical refraction phenomenon effect known as "heat haze" impacts weapon systems with attached optics. This is due to the radiant heat rising from the barrel of the firearm and any barrel attachment, such as suppressors, muzzle brakes, and flash hiders during operation. As the intense heat rises upward from the firearm or barrel attachment, the optics can produce distorted sight pictures, leading to the operator and firearm pairing to become less accurate.

SUMMARY

A heat protective device is disclosed herein and includes a sheet having a first edge opposite a second edge. The sheet is comprised of a plurality of intertwined links that are movable with respect to each other. A strip is positioned between the first edge of the sheet and the second edge of the sheet. A fastener couples the first edge of the sheet and the second edge of the sheet to the strip to form a tubular shape. The fastener is configured to adjust a diameter of the tubular shape to releasably fix the heat protective device about an object.

A method for manufacturing a heat protective device is disclosed herein and includes printing, by a 3D printer, a sheet having a first edge and a second edge. The sheet is comprised of a plurality of intertwined links that are movable with respect to each other. A jig is provided having a base with a top surface, and a plurality of protrusions coupled to the top surface and extending above the top surface. Each protrusion of the plurality of protrusions is spaced apart from one another. The sheet is placed on the top surface of the jig so the plurality of intertwined links of the sheet are positioned between the plurality of protrusions of the jig. Heat is applied to the sheet and then the sheet is removed from the jig to form the heat protective device. The sheet and the jig are comprised of the same material and volumetrically shrink at the same rate during the heating.

BRIEF DESCRIPTION OF THE DRAWINGS

FIG. 9A shows a top view of a jig and a sheet, in accordance with some embodiments.

FIG. 12 is a perspective view of a heat protective device, in accordance with some embodiments.

DETAILED DESCRIPTION

Figure 1:
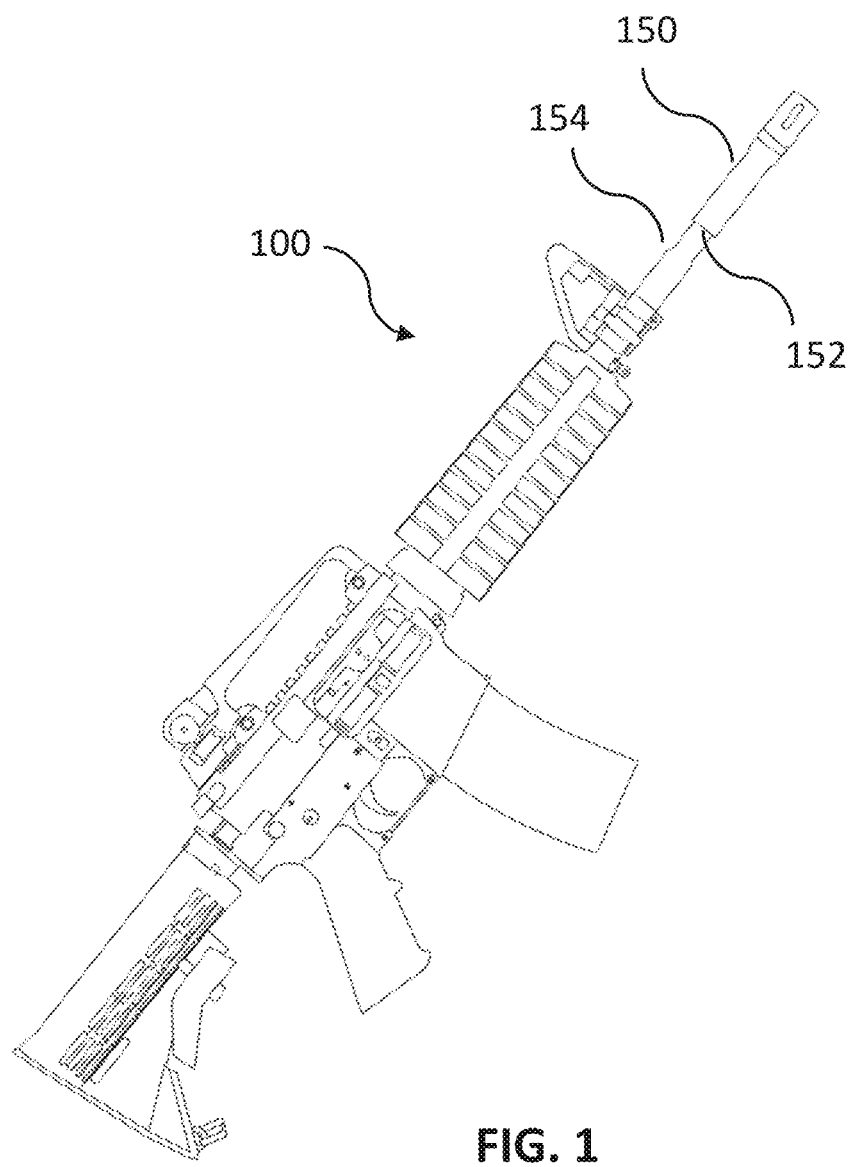
FIG. 1 is a perspective view of a firearm with a suppressor, as known in the art.

Conventional suppressor covers are fabric sleeves that slide over a suppressor and are typically comprised of nylon, aramids, or other high-temperature textiles. These covers are affixed onto the suppressor with hook-and-loop fasteners or other features. These suppressor covers protect a user against contact with a heated suppressor and can also reduce a mirage effect caused by radiant heat that is emitted from the suppressor while shooting. However, textile or fabric wraps are typically a solid, continuous sheet that completely encapsulate the suppressor and fully insulate the suppressor, trapping the heat instead of allowing the heat to dissipate. Consequently, the suppressors can still pose a burn risk when the cover is removed. Also, suppressor cover manufacturers advise that the covers should be removed soon after the firearm has been used to prevent thermal damage that can be caused to the suppressor by the heat build-up, which may reduce the life of the product.

The present disclosure describes a heat protective device made of a chain mail structure. Chain mail typically comprises small links hooked together in a pattern to form a mesh or net. In this disclosure, the chain mail structure comprises intertwined links forming a sheet that allows heat to vent and dissipate while insulating a user from the heated object being covered by the device. A user can thus use their bare hands to touch a surface that they would otherwise be unable to handle for fear of injury. The device provides enough surface area to protect the user and enables gripping interaction with the underlying object (e.g., suppressor or barrel). The heat protective device is uniquely designed to allow ventilation to the underlying object, which also reduces the risk of internal damage to the object from thermal weathering effects. Additionally, the heat protective device can be adjusted to variable dimensions which beneficially enables one device to fit a range of barrel and suppressor sizes.

The intertwined links of the sheet of the heat protective device are made of high-temperature (e.g., thermal stability of at least 400° C.), high-strength, and low thermal conductivity materials such as engineering ceramics. In some embodiments, the sheet is additively manufactured such as by 3D printing. The chain mail structure beneficially allows for large areas of negative (open) space in the links and between the links where heat can flow and dissipate from the underlying object out into the ambient air. The ceramic material (or other material as shall be described later in this disclosure) acts as an insulator due to its low thermal conductivity. The sheet comprised of the intertwined links allows the barrel or suppressor to cool after the discharging of the firearm, instead of fully wrapping it in a solid-surface textile insulator as in conventional suppressor covers. The open structure of the present heat protective device enables natural heating and cooling cycles to occur which results in improved operational life for the firearm or suppressor. The user is protected from the heated object and can interact more easily with the device. For example, with the heat protective device installed over the suppressor, the user can remove an extremely hot suppressor from a barrel with their bare hands rather than waiting several minutes (e.g., ten minutes or more) for the suppressor to cool. With the heat protective device mounted on a suppressor, the user can grasp the heat protective device and use it to contact and remove the heated suppressor without burning themselves. Also, the heat protective device reduces the potential for the covered barrel or suppressor to accidentally burn or injure the user, such as when a firearm is slung around the user's body.

The chain mail structure of the heat protective device is comprised of intertwined links which reduces the weight of the device since the links of the chain mail structure have open spaces instead of a solid form. This enables the user to carry the heat protective device more efficiently and easily, meaning the user will use the heat protective device more often in the field, resulting in greater safety to the user and firearm.

The heat protective device includes a strip positioned between the first edge of the sheet and the second edge of the sheet. The strip is a continuous material comprised of a heat-resistant textile or solid engineering ceramic (or other heat-resistant material) positioned on the top side of the barrel of the firearm or suppressor along the line of sight and below the sight picture and field of view of attached optical devices. The strip blocks or diminishes the optical refraction phenomenon known as heat haze or miraging when sighting a target. This solid, axial top strip component of the heat protective device design improves shooter and weapon accuracy and effectively eliminates heat haze. The strip allows the underlying object such as the suppressor or weapon barrel to heat and cool more cyclically without insulating and trapping residual heat build-up.

The sheet is 3D printed using ceramic materials which require a firing process (heating, e.g., in an oven) to reach the final material property state. During the firing, the plurality of intertwined links of the sheet must be kept spaced apart—not touching one another—and separate from one another to prevent the links from fusing together and the formation of fractures. A jig is designed to support the sheet and hold the plurality of intertwined links apart from one another. The jig has a plurality of protrusions extending outward from a base and spaced apart based on the negative spaces in-between the links of the chain mail structure of the sheet. The plurality of protrusions or vertical pegs are created as the inverse of the negative spaces of the sheet. The dimensions of the base and the plurality of protrusions of the jig are critical to ensure that, during firing, the jig volumetrically shrinks similarly to the sheet. Otherwise, the plurality of intertwined links may shrink at a different rate than the jig, leading to fusing, cracking, or failure.

In this disclosure, although embodiments will be described primarily in relation to firearm barrels and suppressors, the heat protective device is applicable to other tubular objects that become heated, such as exhaust pipes. Furthermore, the heat protective device shall be shown primarily as circular tubes; however, the device need not necessarily be cylindrical but can have other cross-sectional shapes, such as oval or rectangular, and depends on the shape of the underlying object.

FIG. 1 is a perspective view of a firearm with a suppressor, as known in the art. For example, a conventional firearm 100 has a suppressor 150 attached to a muzzle 152, which is the firing end of the barrel 154 of firearm 100. The suppressor 150 is most commonly attached to a firearm by a threaded mount but may also be attached to non-threaded mounts by quick-release mechanisms.

Figure 2:
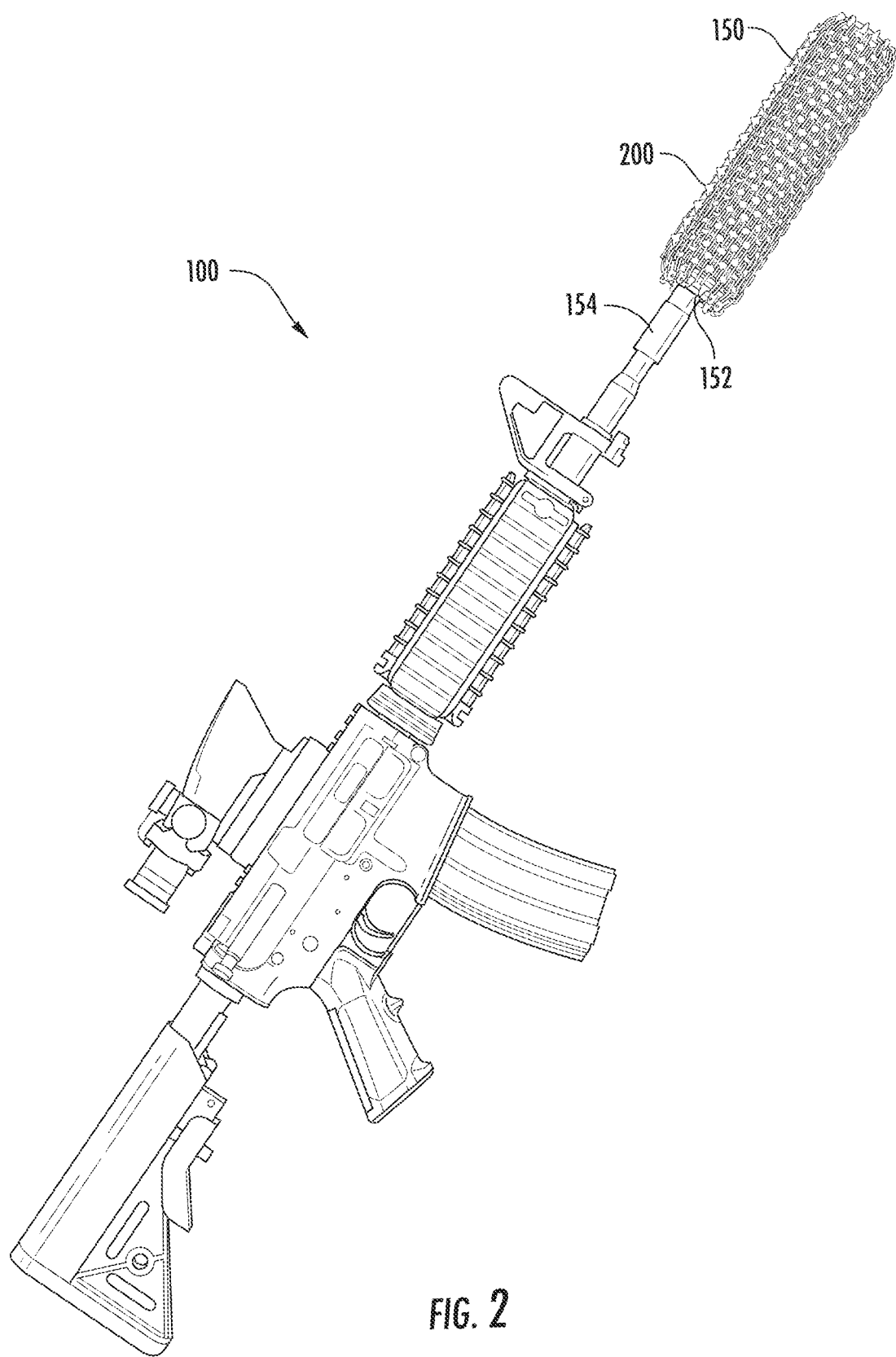
FIG. 2 is a perspective view of a heat protective device, in accordance with some embodiments.

FIG. 2 is a perspective view of a heat protective device 200, in accordance with some embodiments, that has been mounted onto the suppressor 150 (not visible in this illustration, underneath heat protective device 200). The heat protective device 200 is mounted by, for example, sliding the heat protective device 200 onto the suppressor 150 and then adjusting a fastener (not visible in this illustration) to secure the device 200 in place.

Figure 3:
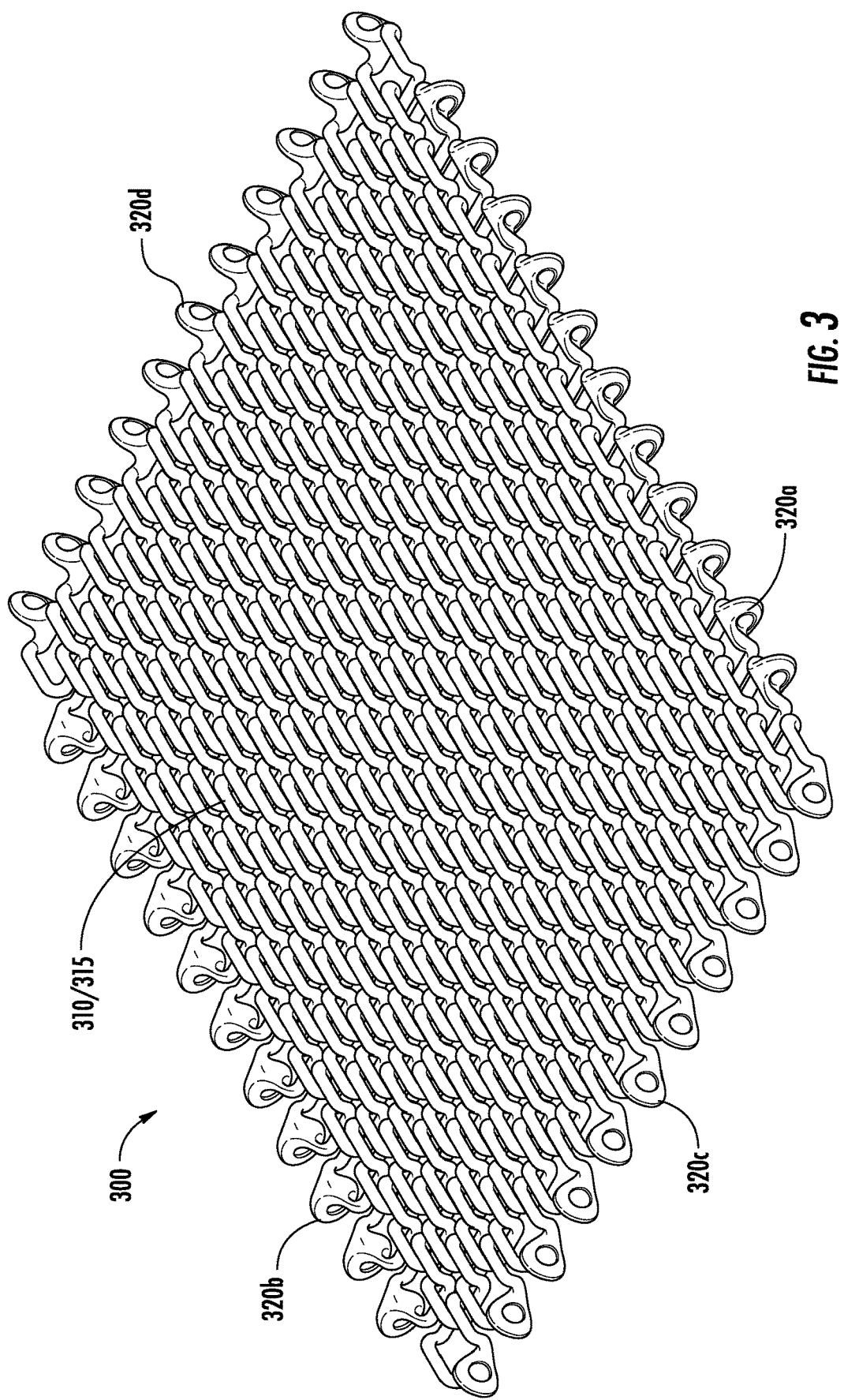
FIG. 3 is a perspective view of a sheet of the heat protective device, in accordance with some embodiments.

FIG. 3 is a perspective view of a sheet 300 of the heat protective device 200, in accordance with some embodiments. The sheet 300 is comprised of a plurality of intertwined links 310 forming a chain mail structure (see FIG. 5 for individual link 315). The sheet 300 may include edges such as a first edge 320a opposite a second edge 320b, and a third edge 320c opposite a fourth edge 320d. Each link 315 of the plurality of intertwined links 310 is spaced apart from each other and movable with respect to each other. In this way, the sheet 300 is conformable such that it can be manipulated and wrapped around the boundaries or circumference of an object such as the suppressor 150.

Figure 4:
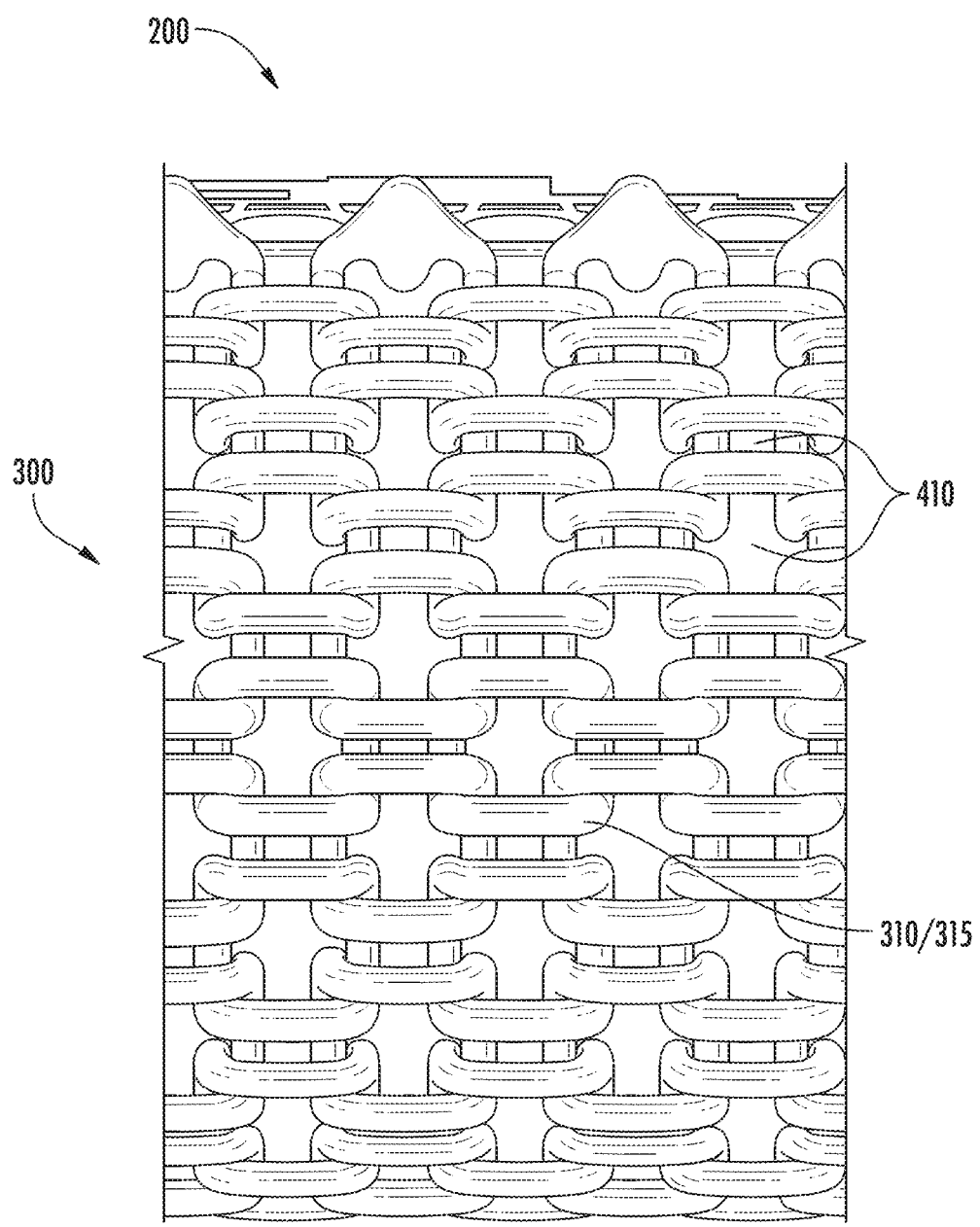
FIG. 4 is a close-up view of a portion of the sheet, in accordance with some embodiments.

FIG. 4 is a close-up view of a portion of the sheet, in accordance with some embodiments. Sheet open spaces 410 are openings within the link 315 and between links 315 in the sheet 300. Each link 315 is intertwined with a neighboring link 315 and the links 315. The amount of open or negative space can be customized by the design and dimension of the links 315. In embodiments, the amount of sheet open space 410 as a percentage of the total surface area of the entire sheet 300 can be, for example, at least 20%, such as 20% to 30%, or 30% to 50%, or 50% to 80%. The openings within the link 315 reduce the material of the link which decreases the weight of the overall device.

Figure 5:
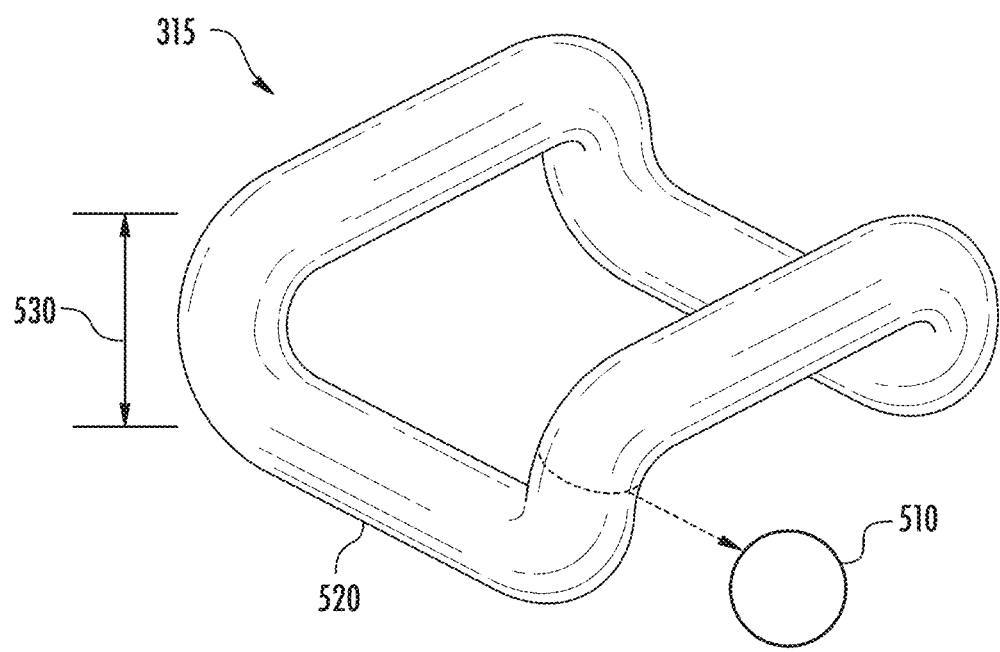
FIG. 5 is a perspective view of a link of the plurality of intertwined links of the sheet, in accordance with some embodiments.

FIG. 5 is a perspective view of a link of the plurality of intertwined links of the sheet, in accordance with some embodiments. In some embodiments, a link 315 has a three-dimensional, rectangular U-shape and a circular cross-section 510. Other link shapes—such as triangular, diamond, or hexagonal links with various cross-sectional patterns— are possible such as more curvilinear shapes. The plurality of intertwined links 310 of the present embodiments are designed to promote heat flow through a thickness of the sheet 300 by providing sheet open spaces 410 for heat convection to occur. The cross-sectional shape of the link 315 can also be tailored to achieve desired heat flow requirements.

In some embodiments, the link 315 has the circular cross-section 510 which provides a strong, tough link 315 while allowing for minimal surface-to-surface area interface which minimizes thermal conduction (therefore enabling the sheet 300 to remain cool enough to touch). The circular cross-section 510 also allows ample ambient air to flow through the chain mail structure of the plurality of intertwined links 310, and through the sheet 300 of the heat protective device 200 to the surface of the underlying object such as the hot suppressor 150. In some embodiments, the cross-sectional diameter of the link 315 may be 0.25 mm to 5.0 mm or more, as one example and depending on the specific application. For example, the cross-sectional diameter of the link 315 may be 2.0 mm. Other cross-sectional shapes are possible such as oval, polygonal, or more complex, differential geometrical patterns. In some embodiments, each link 315 of the plurality of intertwined links 310 in the sheet 300 are identical to each other, while in other embodiments different types of links can be used within the sheet 300.

Figure 6:
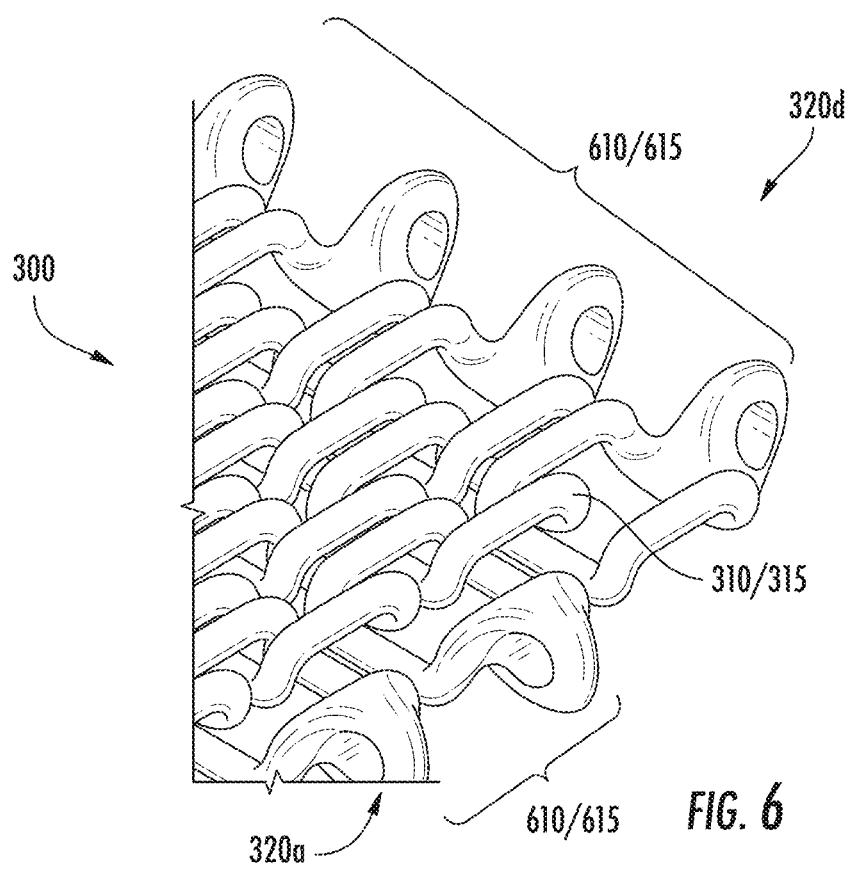
FIG. 6 is a close-up view of a portion of the sheet, in accordance with some embodiments.

FIG. 6 is a close-up view of a portion of the sheet, in accordance with some embodiments. In some embodiments, some links of the plurality of intertwined links 310 further comprise a loop configured to receive a fastener (shown in FIGS. 7A-7C). For example, a link with a loop is an edge link 615 of a plurality of edge links 610. The plurality of edge links 610 may be located at some or all of the edges 320a, 320b, 320c and 320d of the sheet 300. In some embodiments, the edge link 615 of the plurality of edge links 610 may have a bend or curve to wrap around a feature of the underlying object such as a border, lip, or boundary so that a concave surface faces the underlying object. In some embodiments, edge links 615 of the plurality of edge links 610 may be positioned within or throughout the chain mail structure of the sheet 300 in a repeating or nonrepeating pattern, depending on the application.

In addition to considering heat dissipation, the plurality of intertwined links 310 may be designed to assist a user in gripping the object being covered, such as the suppressor 150. Referring to FIG. 5, the rectangular-shaped link 315 has linear arms 520 that will lay against the suppressor 150. When a user grasps the heat protective device 200, the plurality of intertwined links 310 may press against the suppressor 150. Friction between the arms 520 and the suppressor 150 provide grip on the surface of the suppressor 150, enabling a user to grasp and remove the suppressor 150 from the firearm 100 even though the suppressor 150 may still be at a high temperature. In some embodiments, the arms 520 may be designed with some curvature along their length to conform to the cylindrical shape of the suppressor 150. The cross-sectional shape (cross-section 510) of the plurality of intertwined links 310 may also be customized to improve gripping of the suppressor 150, such as by having a flat surface on the side of the link 315 that will be facing the suppressor 150.

The link 315 has a height 530 determining a thickness of the sheet 300, where the height may be customized depending on the strength and toughness required such as for different types of firearms 100. The height 530 of each link 315 of the plurality of intertwined links 310 may range from, for example, approximately 0.5 mm to approximately 5.0 mm or up to approximately 20.0 mm or more depending on the application, with cross-sectional diameters of the link 315 (e.g., for cross-section 510) ranging from, for example, approximately 0.25 mm to approximately 5.0 mm. In an example embodiment of FIG. 5, the link 315 has a height 530 of 6.0 mm with a cross-section 510 that is 2.0 mm in diameter.

Materials for the sheet 300 including the plurality of intertwined links 310 and the plurality of edge links 610, include ceramics which have low thermal conductivity (e.g., 1.5 to 3 W/(m·K)) for limiting heat transfer from the underlying object to the user. The ceramic material may be selected from, for example, silicon carbide (SiC), zirconia ($ZrO_2$), alumina, porcelain, aluminum titanate, silicate, or other ceramic material. Other materials that may be used for the sheet 300 include high-temperature polymers that may also have a metal or ceramic outer layer for increased thermal stability. The outer layer may be applied by, for example, coating, plating or physical vapor deposition (e.g., ceramics with titanium nitride deposited onto it). In some embodiments, the plurality of intertwined links 310 is made of a glass, fiberglass, or glass-ceramic material; or a concrete, plaster, cement, clay, mortar, brick, or bound sand material. The sheet 300 may also be produced using a metallic, carbon, or ceramic open-cell or closed-cell foam material with a strip of a solid material. Other factors for choosing materials for the sheet 300 are thermal shock resistance, flexural strength, and bending strength. Because of the harsh operating conditions encountered during use of firearms, and even for exhaust pipes (e.g., vibration and impact forces), the sheet 300 must meet not only thermal but mechanical strength requirements. The use of high strength materials makes the device durable for field use.

Figure 7A:
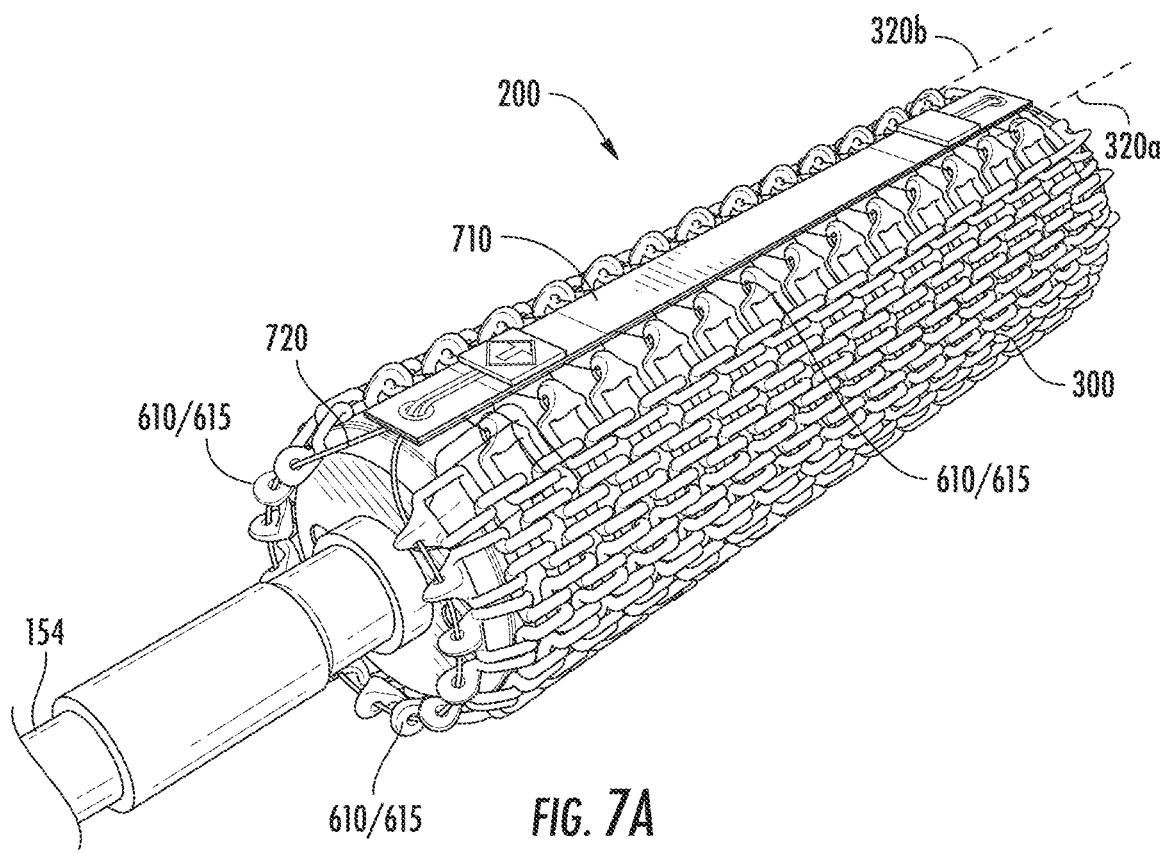
FIG. 7A is a perspective view of the heat protective device, in accordance with some embodiments.
Figure 7B:
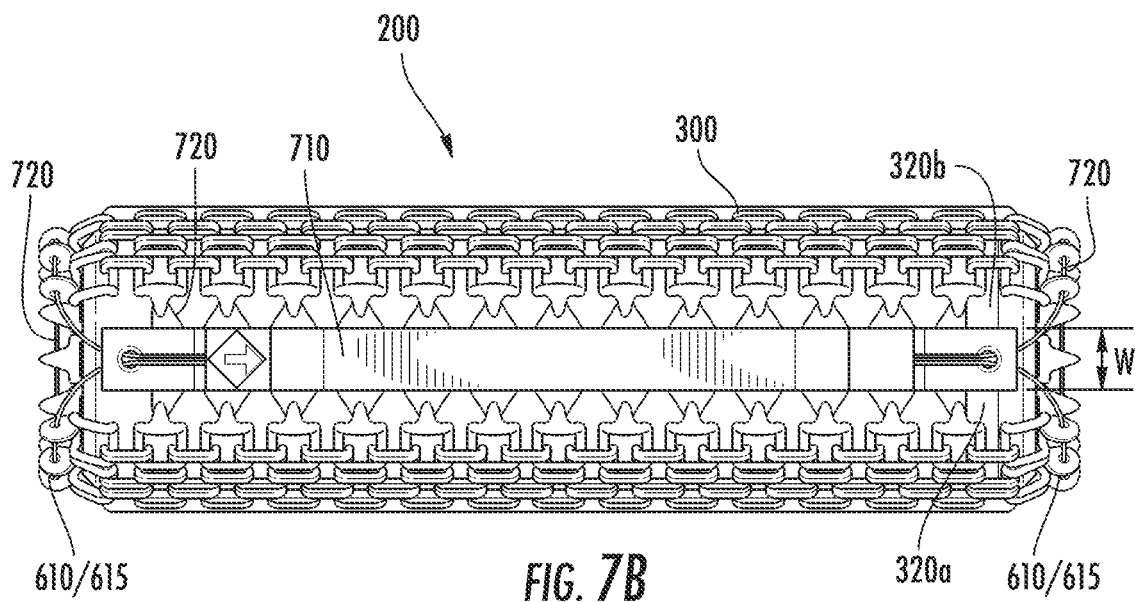
FIG. 7B is a top view of the heat protective device, in accordance with some embodiments.

FIG. 7A is a perspective view of the heat protective device, in accordance with some embodiments, and FIG. 7B is a top view of the heat protective device, in accordance with some embodiments. The heat protective device 200 includes a strip 710. The strip 710 is positioned between the first edge 320a of the sheet and the second edge 320b of the sheet, which are edges that that run axially along the length of the underlying object. The strip 710 is a continuous material comprised of a heat-resistant textile or fabric selected from meta-aramid polymers (e.g., NOMEX®), composite textiles, ceramic-coated textiles, ceramic fiber textiles, solid plates of heat-resistant ceramics or other materials. The strip 710 is constructed with high temperature resistant thread or other fastening or bonding methods. A fastener 720 couples the first edge 320a of the sheet 300 and the second edge 320b of the sheet 300 to the strip 710 to form, for example, a tubular shape. Other shapes are possible, and the shape depends on the underlying object that the heat protective device 200 is covering or surrounding. Since the sheet 300 is conformable due to the plurality of intertwined links 310 being movable relative to one another, many other shapes are possible.

Figure 7C:
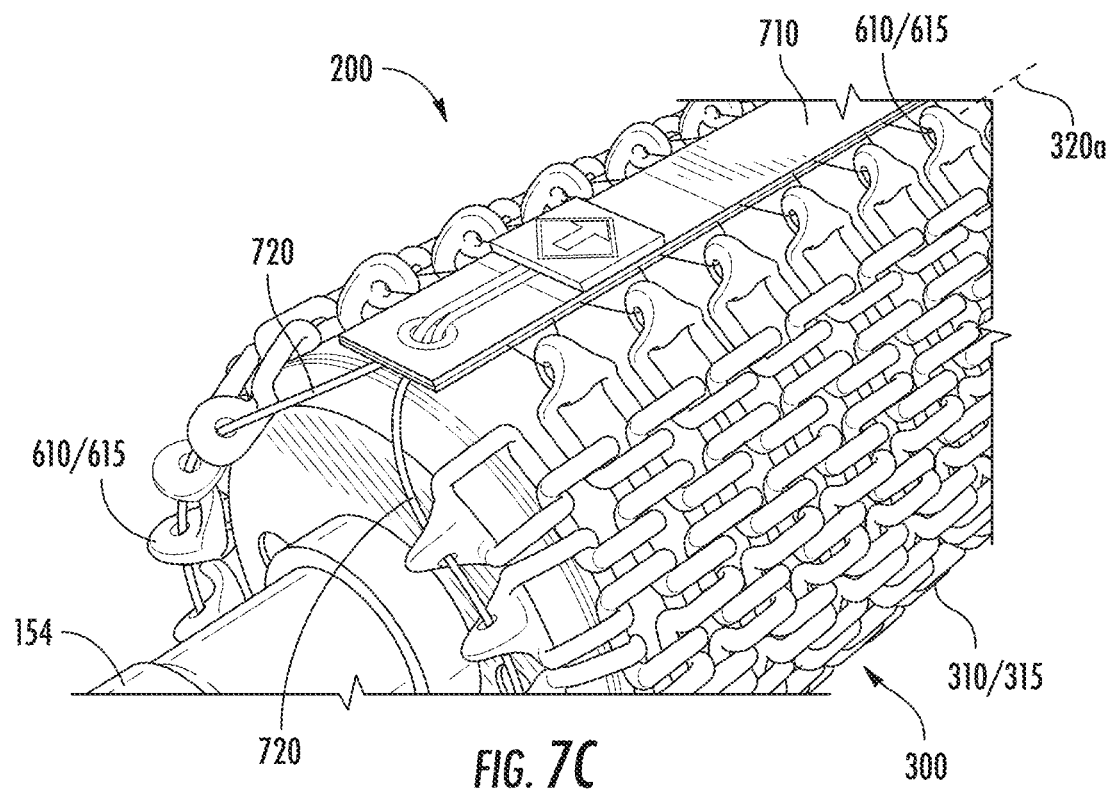
FIG. 7C is a close-up view of a portion of FIG. 7A, in accordance with some embodiments.

FIG. 7C is a close-up view of a portion of FIG. 7A, in accordance with some embodiments. The fastener 720 may be a flexible linear component selected from a thread, wire, strap, cord, ribbon, lace, tie, or other method. The fastener 720 is configured to adjust a diameter of the tubular shape to releasably fix the heat protective device 200 about an object (such as a suppressor 150). For example, the fastener 720 may pass through the loops of the plurality of edge links 610 on the first edge 320a and the second edge 320b of the sheet 300 and the strip 710. The fastener 720 may be pulled or drawn to change the diameter of the tubular shape of the heat protective device 200. When the tubular shape is snugly fitted to the underlying object, the fastener 720 may be tightened under tension and secured by means such as a tab, hook-and-loop, magnets, or the like.

In some embodiments, the fastener 720 may be threaded through the loops of the plurality of edge links 610 on the third edge 320c and the fourth edge 320d of the sheet 300 to the strip 710, which are edges that are wrapped circumferentially around the underlying object. The plurality of edge links 610 may have a bend in their profile to wrap around a curved surface further gripping the underlying object. A tension force may be applied to the fastener 720 and secured as described herein. The adjustability of the size of the heat protective device 200 enables a single product size to cover a range of outer diameters of barrels, suppressors, and other objects. In some embodiments, the fastener 720 may couple the sheet to the strip 710 by other means such as hook-and-loop features, high-temperature adhesive, clasps, clips, or other mechanical attachments.

Figure 8:
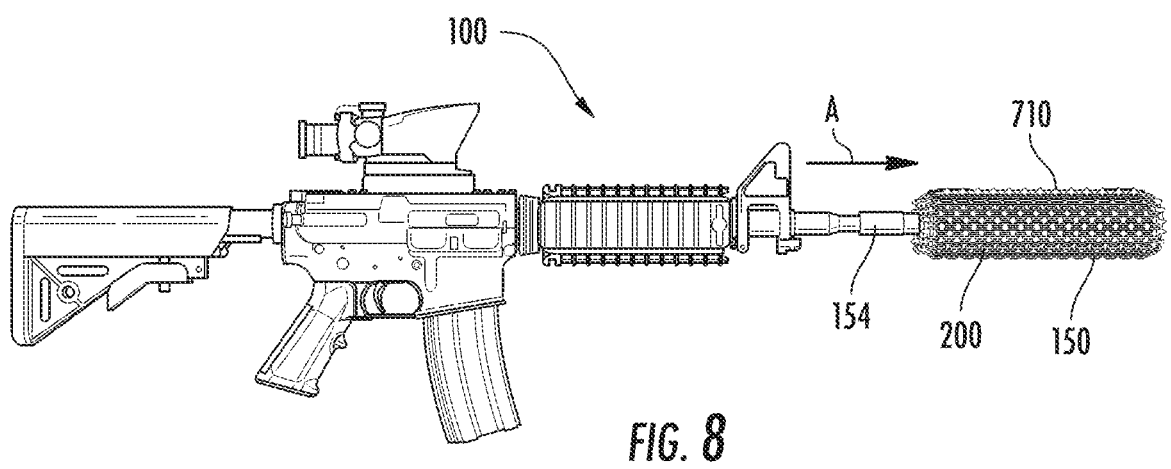
FIG. 8 is a side view of the heat protective device installed on a firearm, in accordance with some embodiments.

FIG. 8 is a side view of the heat protective device installed on a firearm, in accordance with some embodiments. The heat protective device 200 is orientated on the underlying object such as the suppressor 150 of the barrel 154 of the firearm 100, with the strip 710 extending outward and upward on the top surface of the suppressor 150. For example, the strip 710 is positioned on the top side of the barrel 154 of the firearm 100 and suppressor 150 along the line of sight and below the sight picture and field of view of the optical device which is indicated as arrow A. The location of the strip 710 blocks or diminishes the optical refraction phenomenon known as heat haze or miraging when sighting a target. The strip 710 is effective in mitigating the heat haze when using the front and rear sights of the firearm as well as when using attached optics on the firearm.

The size of the strip 710 can be customized. The strip has a width such as when lying flat, and when the strip is placed on a circular object, the width becomes a length around a circumference or perimeter and may be referred to as an arc length. This is shown in FIG. 7B as label W. Through investigations performed in relation to the present disclosure, a unique insight was gained that the minimum arc length of the strip 710 to adequately mitigate the miraging effect was found to be dependent on the average radius of the underlying object. In embodiments, the strip 710 has an arc length around the circumference of the object, and the width of the strip is based on an average radius of the object. It was discovered that when the underlying object has an average radius less than or equal to 12.7 mm, the width of the strip 710 (or arc length of the strip 710) should be two times the average radius of the object for effective mitigation of the miraging effect. For example, if the underlying object has a radius of 12.7 mm, the circumference (circumference=2× radius×pi) of the underlying object is 79.8 mm, and the strip should have a width of 25.4 mm (or effective arc length when wrapped around the underlying object).

Similarly, when the object has the average radius ranging from greater than 12.7 mm to less than 38.1 mm, the width of the strip 710 should be 1.5 to 2 times the average radius of the object for effective mitigation of the miraging effect. Lastly, when the average radius ranges from greater than or equal to 38.1 mm, the width of the strip 710 should be 1.0 to 1.5 times the average radius of the object for effective mitigation of the miraging effect. Thus, it was unexpectedly found that the greater the diameter of the underlying object, the smaller the width of the strip that was needed relative to the diameter of the underlying object to effectively reduce the heat haze or miraging effect on attached optical devices. Optimizing the width of the strip in this manner beneficially prevents heat miraging effects while still insulating the user from the heated underlying object and ensuring that the weight of the heat protective device is optimized. Creating a wider solid strip would add unwanted weight to device, limiting its favorability with users.

The heat protective device 200 may be easily, quickly, and firmly installed or removed from the underlying object. To install the heat protective device 200, the fastener starts in an expanded, slack state. The heat protective device 200 may be slipped over the suppressor 150 or object and positioned to fully wrap or cover the suppressor 150. The strip 710 is positioned on the top side of the barrel 154 and the fastener 720 is tightened by applying a force away from the object until the plurality of the intertwined links 310 of the sheet 300 is in tight contact such as gripping the object. The fastener 720 is secured, such as by attaching an end of the tensioned fastener 720 to the strip 710. The gripping of the plurality of intertwined links 310 to the object enables the strip 710 to be held in place on the top surface of the barrel 154 without slipping. This improves shooter and weapon accuracy by effectively eliminating heat haze.

The heat protective device 200 may be removed by loosening the fastener 720, then grasping the sheet 300 and pulling it away from the object. In some embodiments, heat protective device 200 may naturally slide off the object after the fastener 720 is disengaged from the secured position.

Figure 9B:
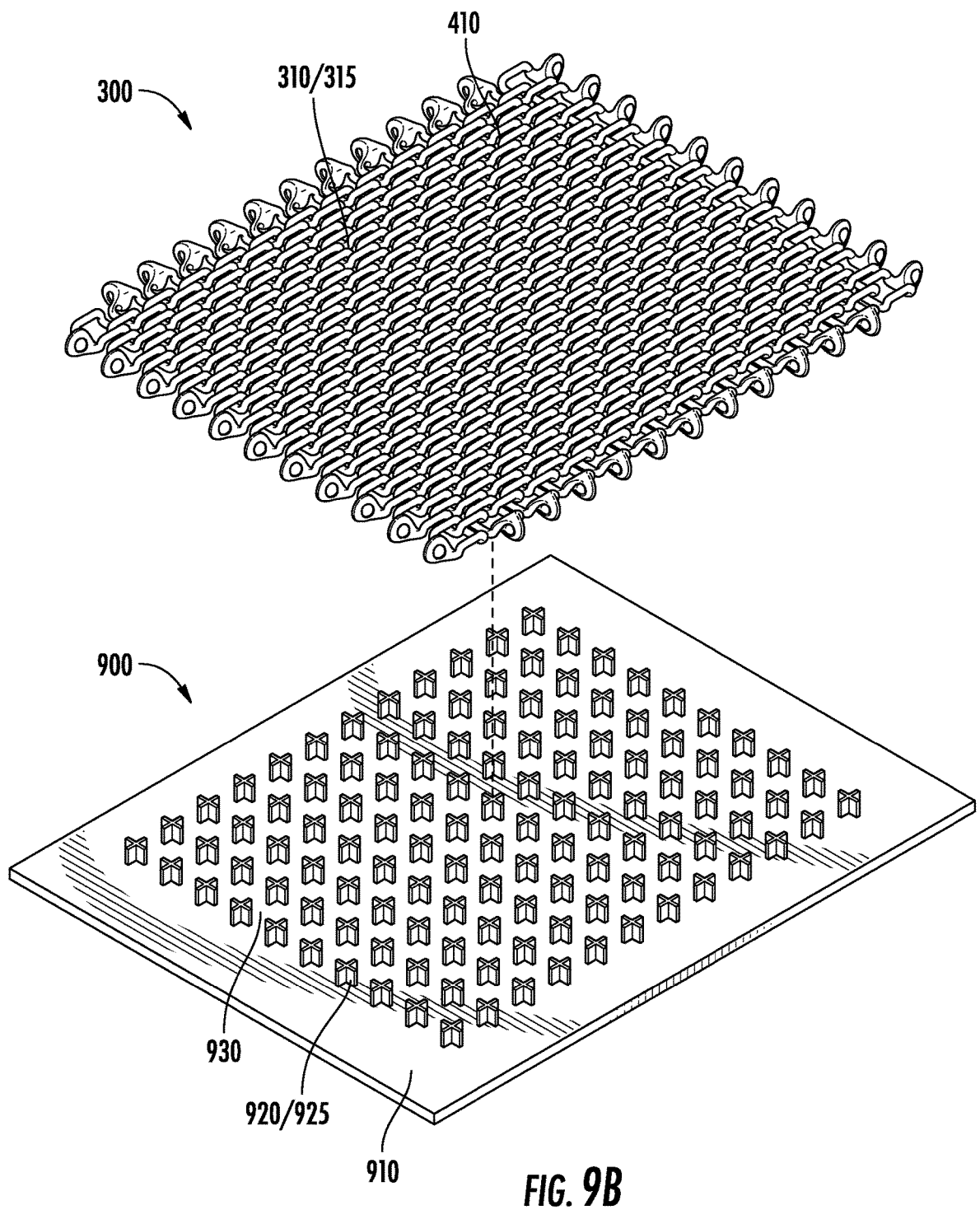
FIG. 9B is a perspective view of a jig and a sheet, in accordance with some embodiments.
Figure 9C:
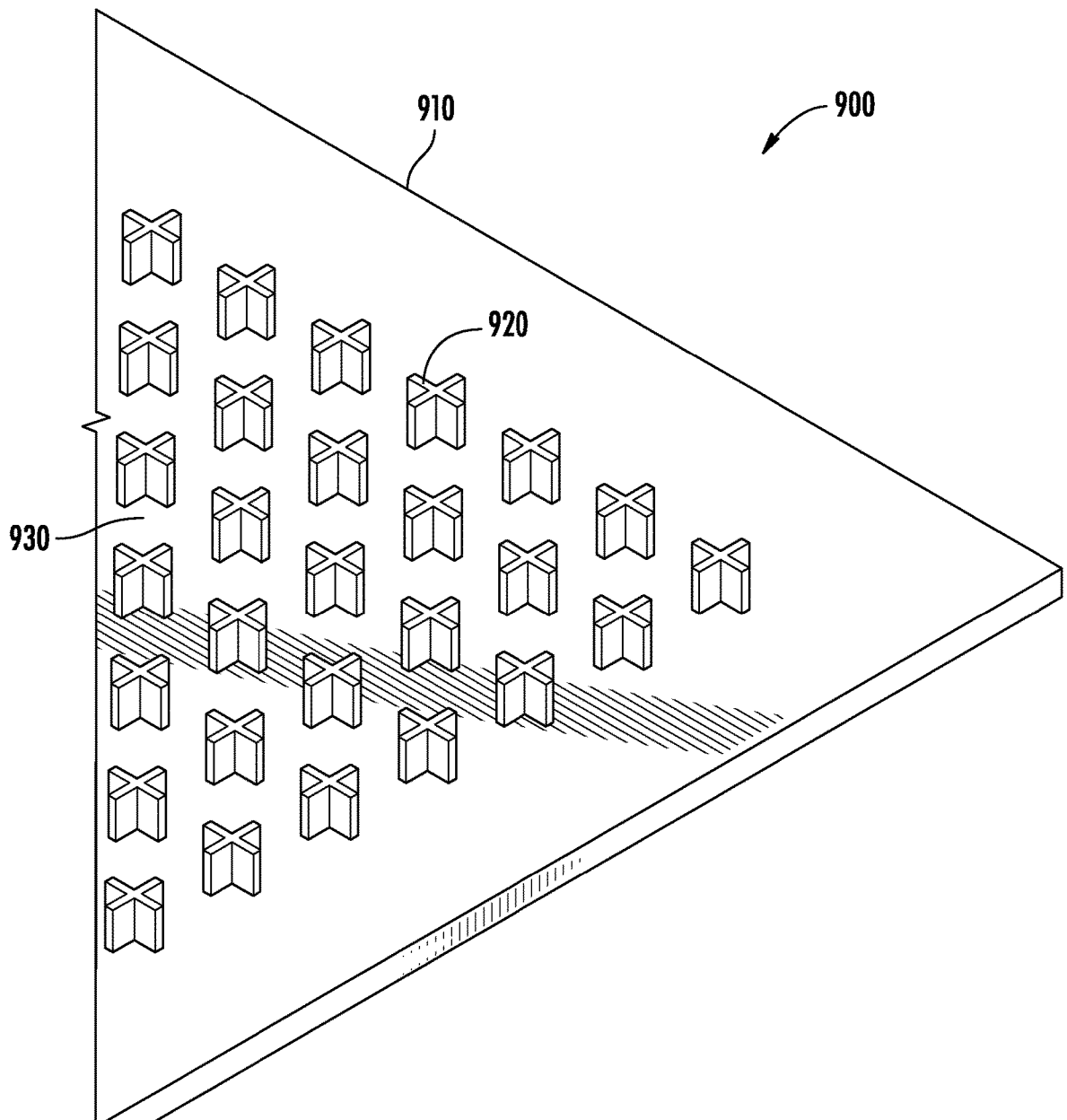
FIG. 9C is a close-up perspective view of a portion of FIG. 9B, in accordance with some embodiments.

In some embodiments, the sheet 300 may be manufactured by 3D printing. FIG. 9A shows a top view of a jig and a sheet, FIG. 9B is a perspective view of a jig and a sheet, and FIG. 9C is a close-up perspective view of a portion of FIG. 9B, all in accordance with some embodiments. As described, the sheet 300 may be comprised of a ceramic material which is fired such as in a kiln or furnace for the ceramic material to reach its final material property state. During the firing, the plurality of intertwined links 310 of the sheet 300 must stay separated from one another and should not fuse to themselves. To ensure this, a sacrificial firing fixture—a jig 900—is used. The jig 900 is designed based on the sheet open spaces 410 existing between the plurality of intertwined links 310 of the chain mail structure. The jig 900 has a base 910 with a top surface, and a plurality of protrusions 920 coupled to the top surface and extending above the top surface. Each protrusion 925 of the plurality of protrusions 920 is spaced apart from one another, and in some embodiments, may a T-shape. Other shapes are possible such as cylindrical, rectangular, square, or triangular.

Jig open spaces 930 are areas between protrusions 925 of the plurality of protrusions 920. The amount of jig open spaces 930, or open or negative space between neighboring protrusions 925 can be customized based on the design and dimensions of link 315. In embodiments, the total amount of jig open space 930 as a percentage of the total surface area of the base 910 of the jig 900 can be, for example, at least 20%, such as 20% to 30%, or 30% to 50%, or 50% to 80%.

Figure 9D:
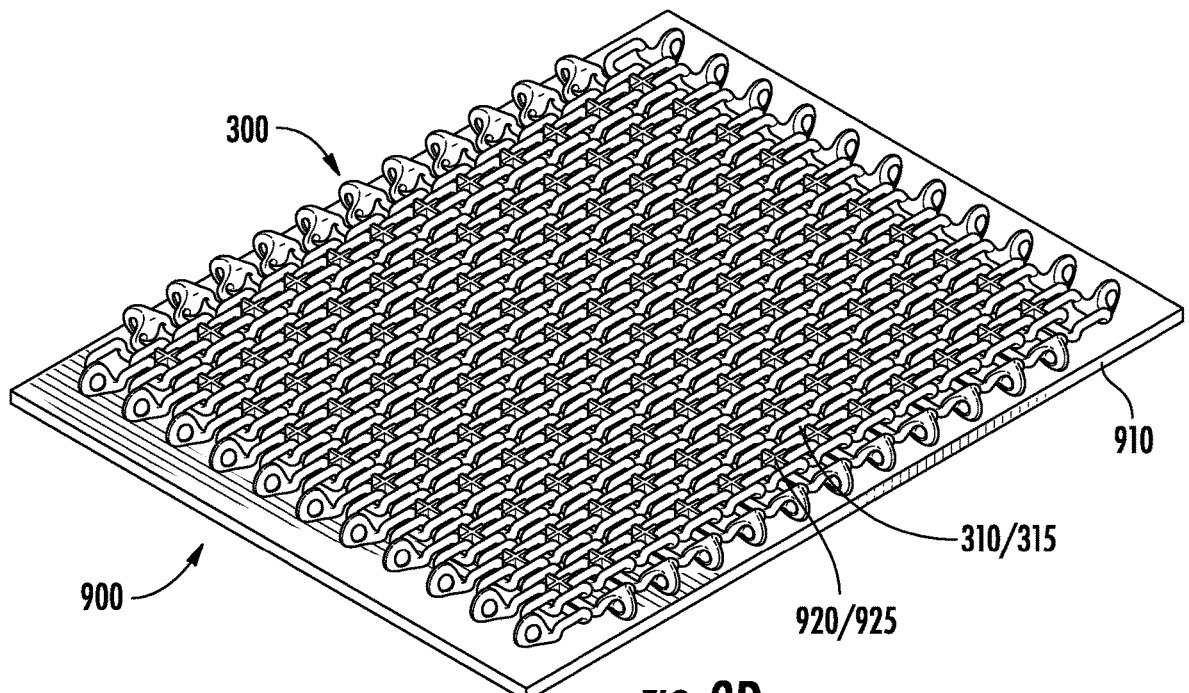
FIG. 9D shows a perspective view of the sheet on the jig, in accordance with some embodiments.
Figure 9E:
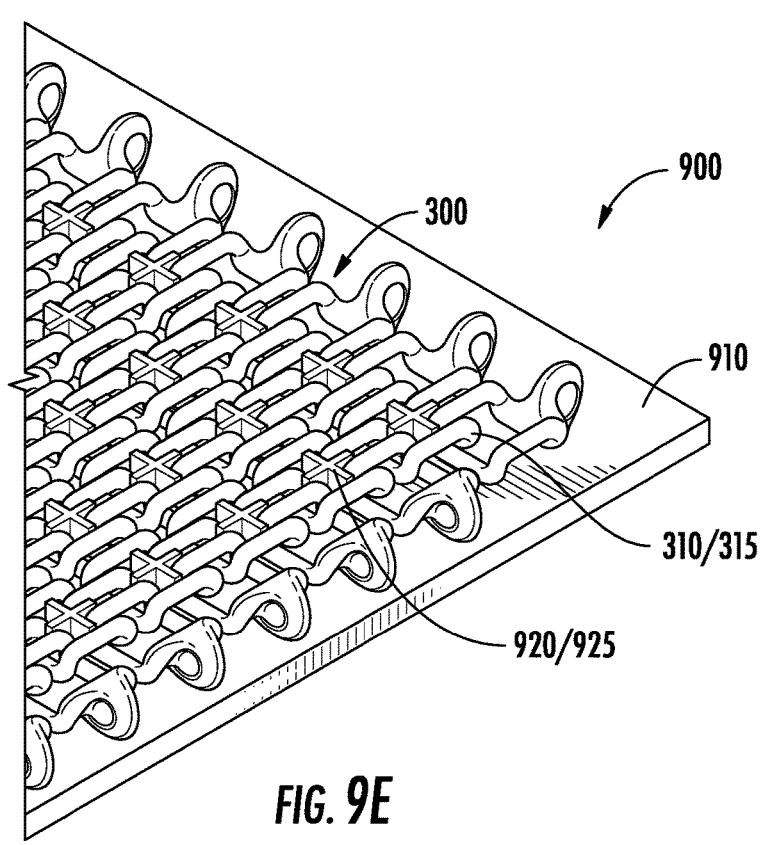
FIG. 9E is a close-up perspective view of a portion of FIG. 9D, in accordance with some embodiments.

FIG. 9D shows a perspective view of the sheet on the jig, in accordance with some embodiments, and FIG. 9E is a close-up perspective view of a portion of FIG. 9D, in accordance with some embodiments. Before firing, the sheet 300 is placed on the top surface of the jig 900 and each protrusion 925 of the plurality of protrusions 920 holds each link 315 in place and prevents the plurality of intertwined links 310 from contact with one another. Each protrusion 925 of the plurality of protrusions 920 is spaced apart according to a width of a link 315 of the plurality of intertwined links 310. This keeps the plurality of intertwined links 310 separate and not contacting one another and prevents the links 315 from fusing together during the firing. In some embodiments, each protrusion 925 of the plurality of protrusions 920 may fit inside of each link 315 of the plurality of intertwined links 310 or each protrusion 925 of the plurality of protrusions 920 may between each link 315 of the plurality of intertwined links 310.

In embodiments, the jig 900 is specially designed to maintain the integrity of the plurality of intertwined links 310 during firing. In one aspect using ceramic materials as an example, the jig 900 is comprised of the same material as the sheet 300 to accommodate the shrinkage of 3D printed ceramics that is known to occur during the firing process (e.g., more than 20% in any dimension). In a second aspect, the dimensions of jig 900 are designed to volumetrically shrink at the same rate as the sheet 300. For example, the dimensions of the base and protrusions of the jig 900 are tuned to volumetrically shrink at a similar rate as the chain mail structure of the sheet 300. This helps to prevent the links 315 from fusing to one another, cracking, or experiencing other failure of the plurality of intertwined links 310. In some embodiments, the thickness of the base 910 of the jig 900 may be 1.0 to 2.5 times the average diameter of the link 315. For example, the thickness of the base 910 of the jig 900 may be 3.0 mm and the cross-sectional diameter of the link 315 of the plurality of intertwined links 310 may be 2.0 mm.

Each protrusion 925 of the plurality of protrusions 920 may have a wall thickness of 0.25 to 1 time an average diameter of a link 315 of the plurality of intertwined links 310. In some embodiments, the wall thickness of each protrusion 925 of the plurality of protrusions 920 is 1.0 mm and the cross-sectional diameter of the link 315 of the plurality of intertwined links 310 may be 2.0 mm.

These dimension multipliers produce a volumetric shrinkage in line with the shrinkage of the sheet 300. Put another way, embodiments utilize unique dimensional relationships between the links 315 and the firing jig 900 that were not straightforward to derive. As one example, it was unexpectedly found that certain thicknesses of the base 910 caused fracturing of the links 315 during firing due to shrinkage-based collisions between the two objects. By using these design guidelines, the sheet 300 may be efficiently draped over the jig 900 with the plurality of protrusions 920 inserted in each link 315 of the plurality of intertwined links 310. Thus, the plurality of intertwined links 310 are separated from one another throughout the entire firing process, and the jig 900 effectively shrinks with the sheet 300 reducing the propensity collision between the plurality of protrusions 920 and the plurality of intertwined links 310.

In some embodiments, the jig 900 is also 3D printed using the same material as the sheet 300. The printing of the jig 900 may occur at the same time and on the same printer as the sheet 300, or on a different printer than the printer printing the sheet 300.

Figure 10:
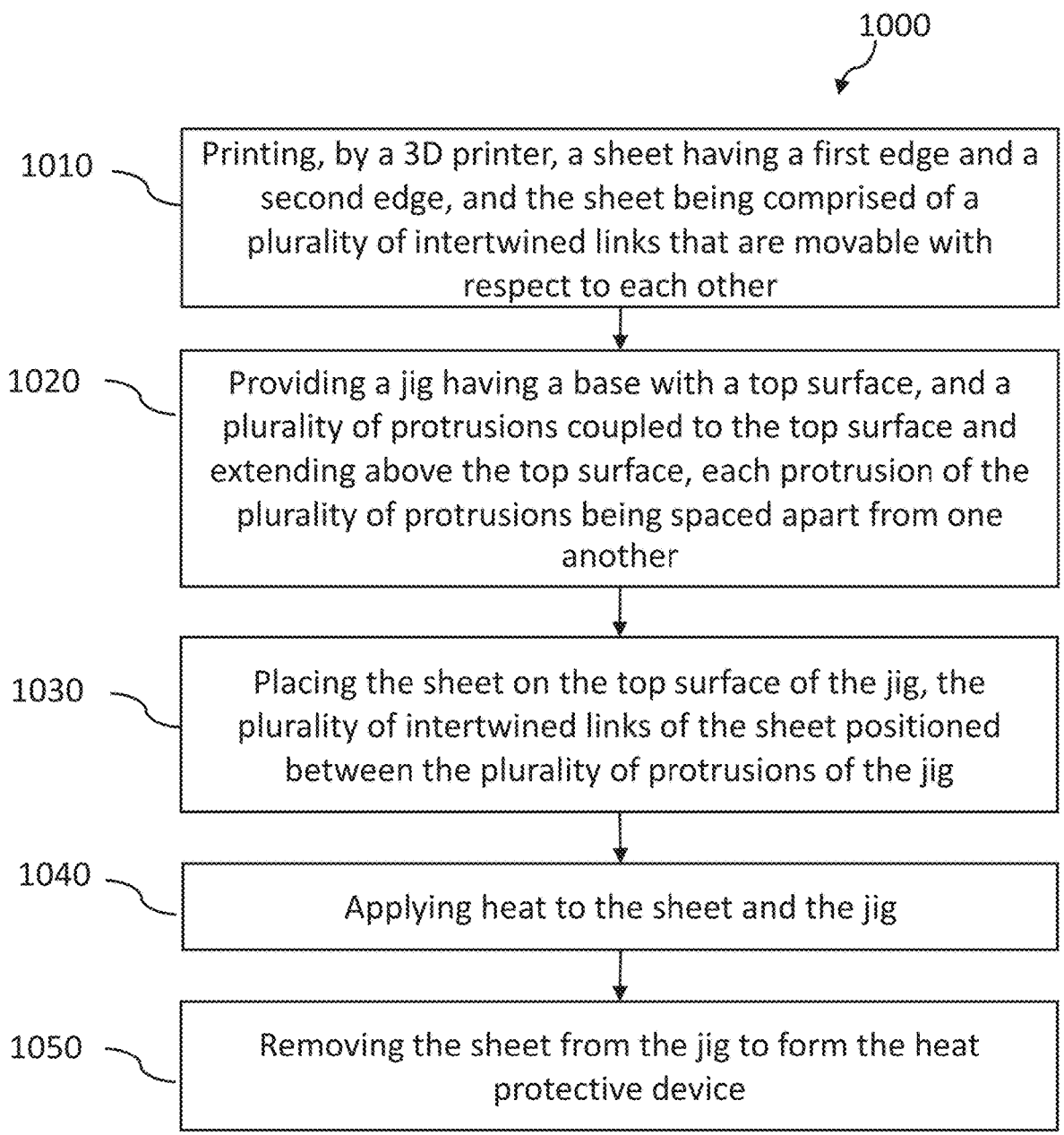
FIG. 10 is a flowchart for a method for manufacturing a heat protective device, in accordance with some embodiments.

FIG. 10 is a flowchart for a method for manufacturing a heat protective device, in accordance with some embodiments. A method 1000 starts at block 1010 by printing with a 3D printer, a sheet 300 having a first edge 320a and a second edge 320b. The sheet 300 is comprised of a plurality of intertwined links 310 that are movable with respect to each other. Several different types of 3D printing may be used such as Stereolithography (SL), Selective Laser Sintering (SLS), Fused Deposition Modeling (FDM), Digital Light Processing (DLP), Multi-Jet Fusion (MJF), PolyJet, Direct Metal Laser Sintering (DMLS), Electron Beam Melting (EBM), binder jetting, or the like.

At block 1020, a jig 900 is provided having a base 910 with a top surface, and a plurality of protrusions 920 coupled to the top surface of the base 910 and extending above the top surface. Each protrusion 920 of the plurality of protrusions 920 is spaced apart from one another. The jig 900 is comprised of the same material as the sheet 300. In some embodiments, the jig 900 is also 3D printed. For example, the sheet 300 and the jig 900 may be printed in alternating layers on the same printer and at the same time, but are separate, unconnected components. In another example, the sheet 300 and the jig 900 may be printed in separate 3D printers.

In some embodiments, the sheet 300 may undergo a sintering process. The sintering process consists of applying low heat such as in an oven at 300° F. to 500° F. to the sheet 300 for a short duration of time such as up to 5 minutes to remove glue or residue on the components from the printing. The temperature and duration of time does not affect the material properties of the ceramic material of the sheet 300. Optionally, the jig 900 may be coated with a material to aid in the removal of the sheet 300.

At block 1030, the sheet 300 is placed on the top surface of the jig 900 so the plurality of intertwined links 310 of the sheet 300 are positioned between the plurality of protrusions 920 of the jig 900 (refer to FIG. 9D) or the plurality of protrusions 920 of the jig 900 are positioned within the plurality of intertwined links 310.

At block 1040, heat is applied to the sheet 300 and the jig 900 while the sheet 300 is on the top surface of the jig 900. This may be a firing process where heat is applied at 2100° F. to 2300° F. in a kiln or oven for a duration of time such as up to 15 minutes. The plurality of protrusions 920 prevent the plurality of intertwined links 310 from sticking or fusing together which would create stress fractures and damage to the sheet 300. The jig 900 is configured with dimensions to volumetrically shrink at the same rate as the sheet 300 during the firing process. This ensures that fractures in the sheet 300 are not caused during the firing. The jig 900 volumetrically shrinking at the same rate as the sheet 300 is critical. Otherwise, the plurality of intertwined links 310 may be constricted by a non-shrinking jig and have no place to move while contracting then fracture, or by a jig that shrinks at a different rate than the sheet 300 which can also cause stresses on the plurality of intertwined links 310.

At block 1050, the sheet is removed from the jig to form the heat protective device 200. In some embodiments, the shrinkage is up to 22% of the original dimensions. For example, before the heating, the sheet 300 has a first length, a first width and a first height, and the jig 900 has a first length, a first width and a first height. After the heating, the sheet 300 has a second length, a second width and a second height, and the jig 900 has a second length, a second width and a second height. The second length, the second width and the second height of the sheet 300 and of the jig 900 is 18% to 22% less than the first length, a first width and a first height of the sheet 300 and of the jig 900.

After the sheet 300 is removed from the jig 900, the jig is not reusable in the same fashion since it is designed to shrink at the same rate of the sheet 300. Once shrunk after the firing at block 1040, the plurality of protrusions 910 of the jig would not align with the plurality of intertwined links 310 of a newly 3D printed sheet 300 that has not experienced the firing. The jig 900 is sacrificial and can be disposed.

Figure 11:
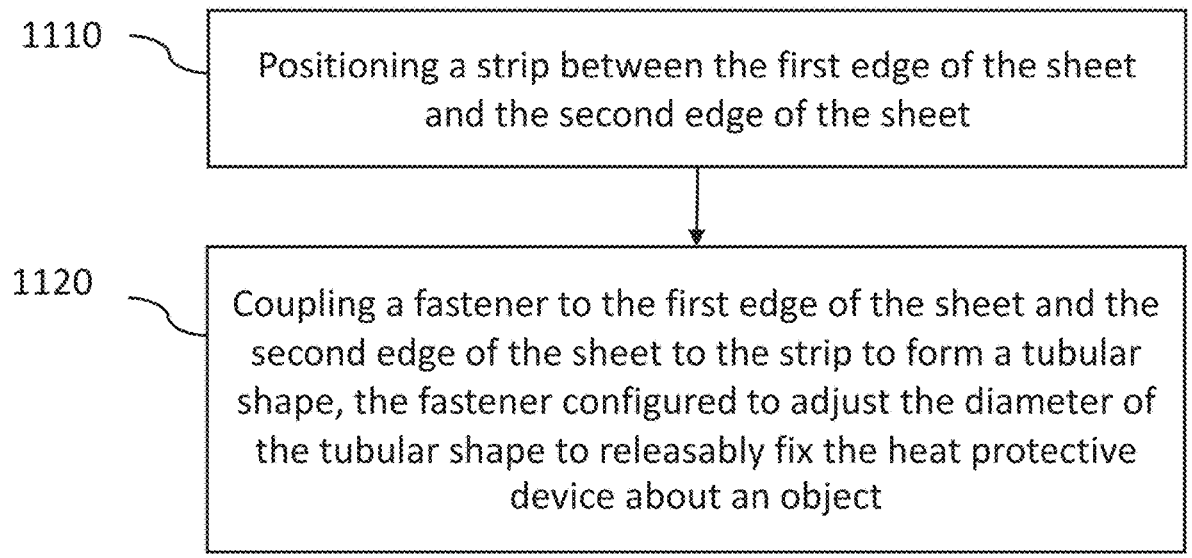
FIG. 11 is a flowchart for further steps for the method for manufacturing a heat protective device described in FIG. 10, in accordance with some embodiments.

FIG. 11 is a flowchart for further steps for the method for manufacturing a heat protective device described in FIG. 10, in accordance with some embodiments. At block 1110, a strip 710 is positioned between the first edge 320a of the sheet 300 and the second edge 320*b* of the sheet 300. At block 1120, a fastener couples the first edge 320*a* of the sheet 300 and the second edge 320*b* of the sheet 300 to the strip 710 to form a tubular shape. The fastener 720 is configured to adjust the diameter of the tubular shape to releasably fix the heat protective device 200 about an object.

The heat protective device 200 can be used for infrared or thermal signature obfuscation. In hostile environments, the firearm and suppressor are heat sinks, and infrared light casts off the suppressor due to the thermal signature, making the firearm, suppressor, and thus, user visible to enemies. The conventional suppressor covers are a solid, continuous material construction, which insulates the suppressor and barrel locking in heat and preventing venting or cooling. This may cause damage to the firearm or suppressor or reduce the lifetime of the firearm or suppressor. In contrast, the heat protective device 200 obscures some of the infrared light generated by the hot suppressor or firearm barrel while allowing the suppressor or barrel of the firearm to naturally cool. Using the heat protective device 200 provides protection to the firearm or suppressor by allowing it to cool naturally, protection to the user so the user can grasp and manipulate the firearm or suppressor without sustaining burns, and obfuscation of the infrared/thermal signature.

FIG. 12 is a perspective view of a heat protective device, in accordance with some embodiments. In another embodiment, the heat protective device may be formed of a continuous loop of material instead of a sheet. For example, a heat protective device 1200 may include a sheet being a sleeve 1210 comprising of a plurality of intertwined links 1220 that are movable with respect to each other. The sleeve 1210 is arranged in a tubular shape, which may be a continuous loop, that is adjustable between a first diameter and a second diameter which is greater than the first diameter. For the first diameter, the plurality of intertwined links 1220 overlap each other by a greater amount than for the second diameter. Each link 1225 of the plurality of intertwined links 1220 may be the same or similar to link 315 of the plurality of intertwined links 310 as described herein.

The heat protective device 1200 has a diameter D1 (e.g., first diameter) when mounted onto the object such as a suppressor. In this state, the links 1225 may be fully overlapping (i.e., as tight as they can be together), or may be partially overlapping (positioned with some spacing relative to each other). The sleeve 1210 has a diameter D2 (e.g., second diameter) where D2 is greater than D1 so that the heat protective device 1200 can be slid onto the suppressor. In diameter D2, the links 1225 are less overlapping with each other than in the contracted state D1. The expansion and contraction between D1 and D2 are possible because the links 1225 that make the chain mail structure of the sleeve 1210 are movable with respect to each other. A user manually pulls the links 1225 farther apart (looser fit with each other) to widen the diameter or pushes the links 1225 closer together (tighter fit with each other) to decrease the diameter. The plurality of intertwined links 1220 overlap each other by a greater amount when in the first (smaller) diameter state than when in the second (larger) diameter state. The adjustability of the sleeve's size enables a single product size of the sleeve 1210 to cover a range of outer diameters of barrels and suppressors.

To install the heat protective device 1200 onto an object, a user stretches the sleeve 1210 (or at least one end of the sleeve) to a diameter greater than the object (e.g., to D2, which may or may not be fully expanded). The object is inserted into an end of the heat protective device 1200 until the sleeve 1210 covers the object. The user then pushes the links 1225 together so that the heat protective device 1200 is contacting the outer surface of the object. When the sleeve 1210 is mounted on the object, the diameter may be any size from D1 up to D2. A securing component is placed onto the sleeve 1210 to hold the heat protective device 1200 onto the object. The securing components may be selected from the group comprising O-rings, straps, ties, wires, or clamps (e.g., ring clamp), where the securing components may be made of fabric, polymers or metal that are able to withstand the temperature of the object being covered.

In some embodiments, the sleeve 1210 may be manufactured by 3D printing. The sleeve 1210 is an additively manufactured piece having a double layer forming a continuous loop. That is, the sleeve 1210 is integrally made as a tubular piece. This may be but in a cylindrical manner or a flattened state. In further embodiments, a strip as described herein may be coupled to a top surface of the sleeve 1210.

Design of the heat protective device 200 must carefully balance many factors that are not straightforward to address. The shape, dimensions, weight, and material for the links of the plurality of intertwined links must balance enough open space for air flow, heat flux, and proper cooling cycles while also providing enough surface area of the links contacting the underlying object to prevent the user's hands, limbs, or body from penetrating through the sheet of the heat protective device, as well as balancing weight to not add undue burden to the user's setup or kit. The surface area and design of the links can also be configured to provide enough surface area for the sheet to adequately grip the suppressor so that the suppressor can be unscrewed from the muzzle. The shape and dimensions of links in the chain mail structure can also be customized to meet a desired range of sizes that the heat protective device can accommodate (e.g., suppressor diameter ranges of 3 cm to 4.5 cm or 4.5 cm to 10 cm).

Manufacturing of the heat protective device 200 must also carefully balance many factors that are not straightforward to address. The jig must be designed with the plurality of protrusions to keep the plurality of intertwined links spaced apart from one another during firing. The jig and the sheet must volumetrically shrink similarly or at the same rate. For example, the jig must be designed with the dimensions along the x, y and z axes relative to the links to accommodate the shrinkage during firing. The plurality of protrusions is between the plurality of intertwined links so if the plurality of protrusions were stationary and not shrinking, the plurality of intertwined links would not have the room to move and shrink and thus be constricted by the protrusions creating fracture, fusing or failure in the sheet.

All of these factors require trade-offs that must be carefully balanced and may require complex design considerations, including complex material properties-to-product design interoperability, manufacturability of the designs, post-processing (cleaning, link separation, and thermal baking), friction interaction with the underlying surface, and use-case-specific durability and usability considerations, such as weight.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method for manufacturing a heat protective device comprising:
   printing, by a 3D printer, a sheet having a first edge and a second edge, and the sheet being comprised of a plurality of intertwined links that are movable with respect to each other;
   providing a jig having a base with a top surface, and a plurality of protrusions coupled to the top surface and extending above the top surface, each protrusion of the plurality of protrusions being spaced apart from one another;
   placing the sheet on the top surface of the jig, the plurality of intertwined links of the sheet positioned between the plurality of protrusions of the jig;
   applying heat to the sheet and the jig; and
   removing the sheet from the jig to form the heat protective device;
   wherein the sheet and the jig are comprised of the same material, and the jig is configured with dimensions to volumetrically shrink at the same rate as the sheet during the heating.

2. The method of claim 1 wherein the jig is 3D printed.

3. The method of claim 1 wherein the sheet and the jig are comprised of a ceramic material selected from silicon carbide (SiC), zirconia ($ZrO_2$), alumina, porcelain, aluminum titanate, or silicate.

4. The method of claim 1 wherein each link in the plurality of intertwined links has a three-dimensional, rectangular U-shape and a circular cross-section.

5. The method of claim 1 wherein the base of the jig has a thickness that is 1.0 to 2.5 times an average diameter of a link of the plurality of intertwined links.

6. The method of claim 1 wherein each protrusion of the plurality of protrusions is T-shaped, and spaced apart from another protrusion according to a width of a link of the plurality of intertwined links.

7. The method of claim 1 wherein each protrusion of the plurality of protrusions has a wall thickness of 0.25 to 1 time an average diameter of a link of the plurality of intertwined links.

8. The method of claim 1 further comprises:
   positioning a strip between the first edge of the sheet and the second edge of the sheet;
   coupling a fastener to the first edge of the sheet and the second edge of the sheet to the strip to form a tubular shape, the fastener configured to adjust a diameter of the tubular shape to releasably fix the heat protective device about an object.

9. The method of claim 8 wherein:
   the strip is a continuous material comprised of a heat-resistant textile selected from meta-aramid polymers, composite textiles, ceramic-coated textiles, or ceramic fiber textiles;
   the strip has an arc length along the object, and the arc length is based on an average radius of the object.

* * * * *